(12) United States Patent
Xu et al.

(10) Patent No.: US 7,266,082 B2
(45) Date of Patent: Sep. 4, 2007

(54) EXPRESSWAY ROUTING AMONG PEERS (75) Inventors: Zhichen Xu, Sunnyvale, CA (US); Zheng Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1197 days.

(21) Appl. No.: 10/231,184

(22) Filed: Aug. 30, 2002

(65) Prior Publication Data

US 2004/0042403 A1    Mar. 4, 2004

(51) Int. Cl.
*H04J 1/16* (2006.01)
(52) U.S. Cl. ............................ 370/238; 370/252
(58) Field of Classification Search .............. 370/254, 370/338, 328
See application file for complete search history.

(56) References Cited

U.S. PATENT DOCUMENTS

| 6,980,524 | B1 * | 12/2005 | Lu et al. ..................... 370/254 |
| 2002/0103903 | A1 * | 8/2002 | Bruton et al. ............... 709/225 |
| 2002/0191584 | A1 * | 12/2002 | Korus et al. ................ 370/349 |
| 2003/0033394 | A1 * | 2/2003 | Stine .......................... 709/222 |

* cited by examiner

Primary Examiner—Chi Pham
Assistant Examiner—Phuc Tran (57) ABSTRACT

In a method for expressway routing among peers, a request is received to forward data. The destination is determined from said request. A routing table is searched for an expressway route based on zones to the destination. The data is transmitted across the expressway route to the destination.

36 Claims, 6 Drawing Sheets

EXPRESSWAY ROUTING AMONG PEERS

CROSS-REFERENCE

The present invention is related to U.S. application Ser. No. 10/237,618 filed on Sep. 10, 2002, and entitled "CREATING EXPRESSWAY FOR OVERLAY ROUTING", by Zhang et al, which is assigned to the assignee and is incorporated by reference herein in its entirety.

FIELD

This invention relates generally to routing. More particularly, the invention relates to expressway routing among peers.

DESCRIPTION OF THE RELATED ART

Peer-to peer (P2P) systems represent a class of networks that utilize distributed resources and perform critical functions in a decentralized manner. Compared with traditional client/server systems, P2P systems have advantages such as improved scalability and reliability, elimination of hot spots surrounding big servers, better resource utilization, lower cost of ownership, etc.

Although P2P may indicate a shift in general purpose computing, the early generation of P2P systems were typically limited to information placement and look-up. One drawback and disadvantage of the earlier P2P systems is they could not guarantee information location for requesting applications. For instance, early P2P systems (e.g., Gnutella and Freenet) searched for a requested object, i.e., requested information, by looking for cached copies via flooding (they use heuristics to reduce the number of nodes that have to be flooded). As the result, the search may fail because the cached copies may not exist even when the requested object exists.

Accordingly, later generations of P2P systems dictated a consistent mapping between an object key to a hosting node. In these systems, an object can always be retrieved as long as the hosting nodes can be reached. The random generation of node identifications and documents keys allow even distribution of the data objects among the hosting nodes. Nodes in these later generation P2P systems comprise an overlay network. Since there is a consistent binding between objects to nodes, locating an object is reduced to the problem of routing to the destination node from the requesting node of where the query is submitted.

However, these later generation P2P systems also have disadvantages and drawbacks. As an example, the overlay network of the later generation P2P systems had limited capability to take advantage of the heterogeneity (e.g., storage capacity, packet forward capacity, network capacity, etc.) of their underlying network. More particularly, the overlay network of the later generation P2P systems were typically homogeneously constructed over the underlying network. Typically, the overlay network was constructed with network proximity as a guide. As a result, the physical topology of the overlay network may cause uneven node distribution and lead to hotspots (e.g., topology aware Content Addressable Network (CAN) from Berkeley).

SUMMARY

An embodiment pertains to a method of expressway routing among peers. The method includes receiving a request to forward data and determining a destination from the request. The method also includes searching a routing table for an expressway route based on zones to the destination and transmitting the data across the expressway route to the destination.

Another embodiment relates to an apparatus for expressway routing among peers. The apparatus includes means for receiving a request to forward data and means for determining a destination from said request. The apparatus also includes means for searching a routing table for an expressway route to the destination and means for transmitting the data across the expressway route to the destination.

Yet another embodiment pertains to a computer readable storage medium on which is embedded one or more computer programs. The one or more computer programs implement a method of expressway routing data among peers in a peer-to-peer (P2P) system. The one or more computer programs comprising a set of instructions for searching a routing table for an expressway route to a destination, where the expressway route being a greatest logical distance between a source to the destination based on zones. The set of instructions also include transmitting the data across the expressway route to the destination from the source.

Yet another embodiment relates to a system for expressway routing among peers in a peer-to-peer (P2P) network. The system includes a peer-to-peer module configured to implement the P2P network, a routing module adapted to interface with the peer-to-peer module and a routing table adapted to interface with the routing module. The routing module is configured to search the routing table for an expressway route to a destination, the expressway route being a greatest logical distance between a source to the destination based on zones and to transmit the data across the expressway route to the destination from the source.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF A PREFERRED EMBODIMENT

For simplicity and illustrative purposes, the principles of the present invention are described by referring mainly to an exemplary embodiments thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with an embodiment, a peer in a peer-to-peer (P2P) network may be configured to route data utilizing expressway routing. More particularly, an expressway overlay network may be implemented over the existing P2P system. The expressway overlay network may provide a mechanism to find the largest span, i.e., logical distance (e.g., a number of hops), between a source peer and a destination peer. The expressway overlay network may be configured to divide the entire space (e.g., a Cartesian space for a CAN system) of the existing P2P system into zones. The largest zone may encompass the entire space of the existing P2P system. Succeeding layers divide the existing P2P system into smaller zones. Each peer may belong to multiple zones within the respective layers and each zone may have more than one zone representative. However, at the highest layer (e.g., the $L^{th}$ layer), each peer may be a member of a base zone (i.e., the basic or discrete unit of the P2P system). The peer may determine the two largest non-overlapping zones between the peer and the destination. An expressway route is formed between the respective zone representatives of the two zones. Accordingly, a substantially direct route, i.e., an expressway, may be formed in order to route data thereby increasing network throughput and reducing the occurrence of hotspots in the underlying network.

In another embodiment, a peer may be configured to determine the largest span between the peer and a destination peer by determining the largest zone that does not encompass the destination peer. More particularly, the peer may receive a request to forward data to a destination peer. The peer may be configured to search an expressway routing table. The expressway routing table may associate a zone that the peer belongs therein with a selected level, where each level in the routing table is associated with a differing sized zone for the peer. For each zone at a selected level, the expressway routing table may also include neighboring zones of similar size (or span). The peer may determine the largest zone that does not encompass the destination peer from the search of the expressway routing table. The associated level of the selected largest zone may designate the span between the peer and the destination peer. The peer may further open a communication channel, e.g., a TCP/IP connection, to the zone representative of the destination zone of similar span of the selected largest zone, which includes the destination peer. The largest zone that encompasses the source peer but not the destination peer can always be found, given the way the zones are formed.

Figure 1:
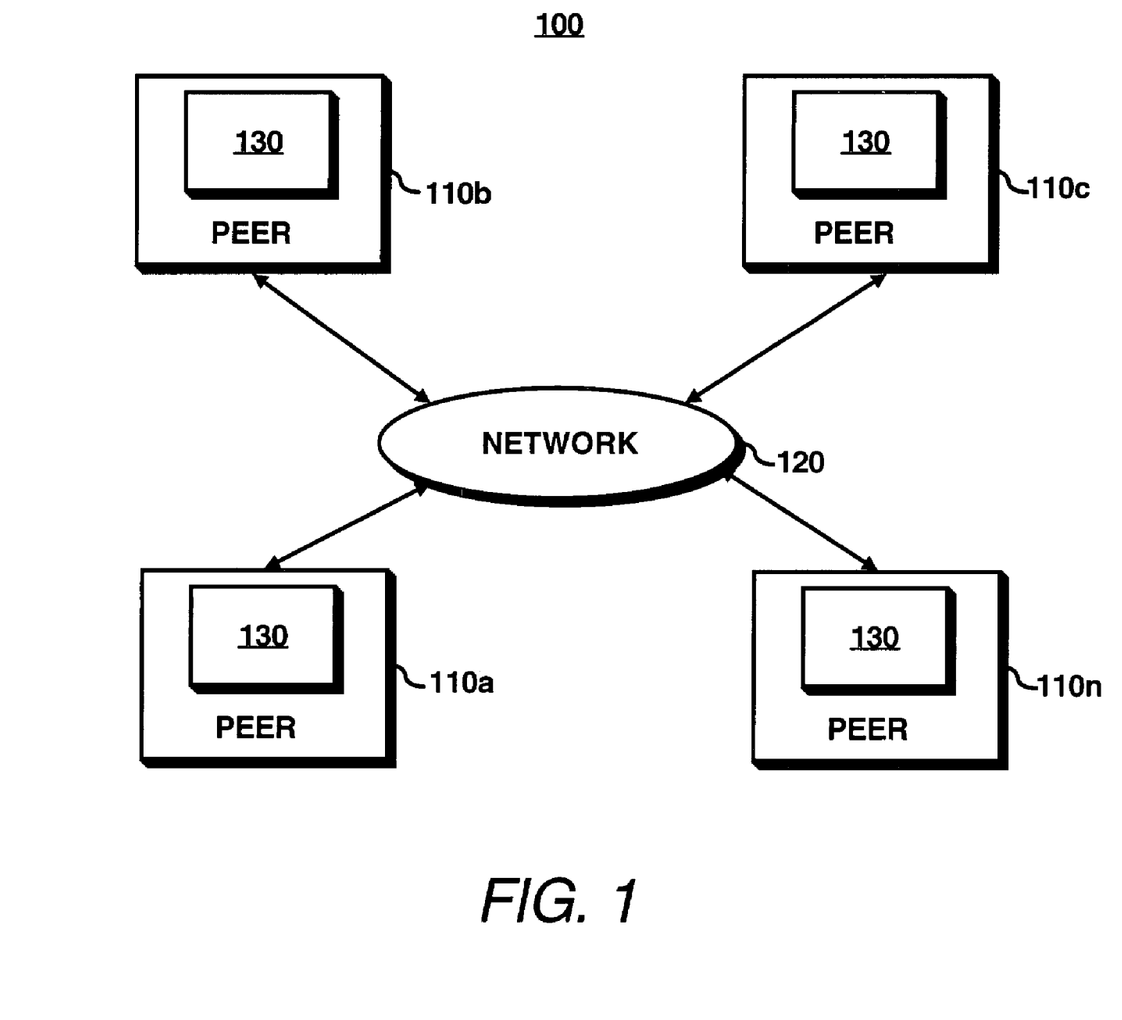
FIG. 1 illustrates an exemplary system where an embodiment may be practiced.

FIG. 1 illustrates an exemplary block diagram of a system 100 where an embodiment may be practiced. It should be readily apparent to those of ordinary skill in the art that the system 100 depicted in FIG. 1 represents a generalized schematic illustration and that other components may be added or existing components may be removed or modified.

As shown in FIG. 1, the system 100 includes a plurality of peers 110a . . . 110n. The peers 110a . . . 110n may be configured to exchange information among themselves and with other network nodes over a network 120. The peers 110a . . . 110n may be computing platforms (e.g., personal digital assistants, laptop computers, workstations, and other similar devices) that have a network interface. The peers 110a . . . 110n may be further configured to execute an application software program that provides the capability to share information (e.g., files, data, applications, etc.) in a peer-to-peer manner. An example of a peer-to-peer software application is KAZAA, NAPSTER, MORPHEUS, or other similar P2P applications.

The network 120 may be configured to provide a communication channel among the peers 110a . . . 110n. The network 120 may be implemented as a local area network, wide area network or combination thereof. The network 120 may implement wired protocols such as Ethernet, token ring, etc., wireless protocols such as Cellular Digital Packet Data, Mobitex, IEEE 801.11b, Wireless Application Protocol, Global System for Mobiles, etc., or combination thereof.

According to an embodiment, each peer of the peers 110a . . . 110b may comprise an expressway routing module 130. The expressway routing module 130 may implement an expressway overlay network for routing data over the existing P2P network, e.g., content addressable network (CAN), CHORD, etc. The expressway overlay network may be configured to divide the entire Cartesian space of the existing P2P system into zones, which is illustrated in FIG. 2.

Figure 2:
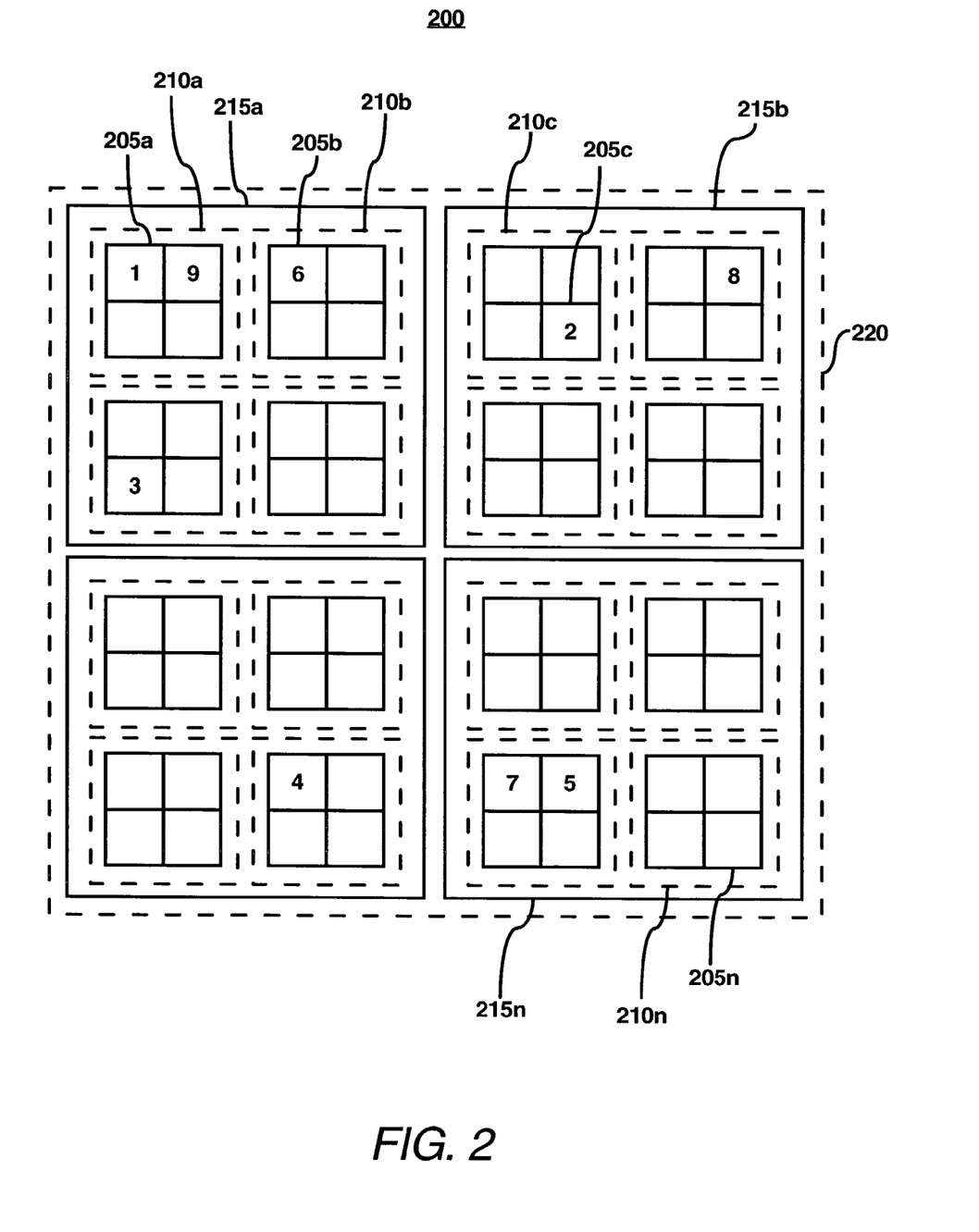
FIG. 2 illustrates an expressway overlay network according to an embodiment.

FIG. 2 illustrates an expressway overlay network 200 according to an embodiment. It should be readily apparent to those of ordinary skill in the art that the expressway overlay network 200 depicted in FIG. 2 represents a generalized abstraction and that other versions may be implemented.

As shown in FIG. 2, base zones 205a . . . 205n may be the core unit of the underlying P2P network zone. For example, if the existing P2P network is a CAN network, the base zone is a CAN zone. In each base zone 205a . . . 205n, a zone representative may be appointed. The zone representative may be considered the owner of the zone and becomes the routing point for data routed to the therein. For example, in zone 205a, peer 1 is the zone representative.

In another embodiment, the underlying network may be a Tapestry network. The prefix of the node identification (ID) may be considered a zone that encompasses the respective peer. The smaller the number of bits in the node ID, the larger the zone. Similarly, in yet another embodiment, the underlying network may be a Pastry network. The suffice of the node ID may be considered a zone that encompasses the peer. The smaller the number of bits in the node ID, the larger the zone. The difference between a CAN zone and a Tapestry zone is that the Tapestry zone is no longer Cartesian space. Rather, it is a set of possible node IDs. Note, in a CAN network, the node IDs are pointers and a Cartesian space is a set of pointers.

As part of the expressway overlay network 200, larger zones may be formed from smaller zones. For example, intermediate zones 210a . . . 210b may be formed from the base zones 205a . . . 205n. Intermediate zones 215a . . . 215n may be formed from intermediate zones 210a . . . 210n. The largest zone 220, the entire space of the P2P network, is formed from intermediate zones 215a . . . 215n.

As with the base zone 205a . . . 205n, the intermediates zones 210a . . . 210n, 215a . . . 215n, may elect (or appoint, select, etc.) one or more zone representatives for each zone. For example, peers 1, 3, and 6, individually and in combination, may become a representative for zone 210a. For example, peer 1 is the zone representative of base zone 205a as well as members of intermediate zones 210a and 215a. As another example, peer 6 may be zone representative for base zone 205b as well as members of intermediate zones 210b and 215b. Similarly, peer 2 can represent zone 205c and 215b.

In accordance with an embodiment, each zone, from base zone to largest zone, may be associated with a level (or span), L. The largest zone 220 may be designated $R_O$ with the base zone designated as $R_L$. Thus, expressway overlay network 200 (see FIG. 2) may have L=3 which is associated with the base zone 205a . . . 205n; L=2 associated with intermediate zones 210a . . . 210n; L=1 associated with intermediate zones 215a . . . 215n; and L=0 for the largest zone 220.

Returning to FIG. 1, the expressway routing module 130 may also be configured to form expressways between a source peer and a destination to route date according to another embodiment. For example, if peer 1 is to forward data to peer 2, peer 1 may determine that the largest zone that does not encompass the peer 2 is intermediate zone 215a (see FIG. 2). Subsequently, peer 1 forms a communication channel, e.g., a TCP/IP connection to the zone representative (e.g., peer 2) of intermediate zone 215b, in FIG. 2, which is peer 2. Accordingly, data is routed in a substantially efficient manner by bypassing as many intermediate peers as possible between peer 1 and peer 2.

In another embodiment, a source peer may route data by expressways to an intermediate peer. More particularly, a source peer may select the largest neighboring zone based on the closest distance of the neighboring zone to the destination peer. For example, if peer 1 is requested to forward data to peer 7 (shown in FIG. 2), peer 1 may determine that the largest zone that does not encompass peer 7 is again 215a. Accordingly, peer 1 forms a communication channel to the zone representative, peer 2, of the largest neighboring zone 215b. Subsequently, peer 2 may search for the largest zone that does not encompass the destination to forward the data. Thus, each intermediate peer searches its routing table to find an expressway route to the destination peer.

Figure 3:
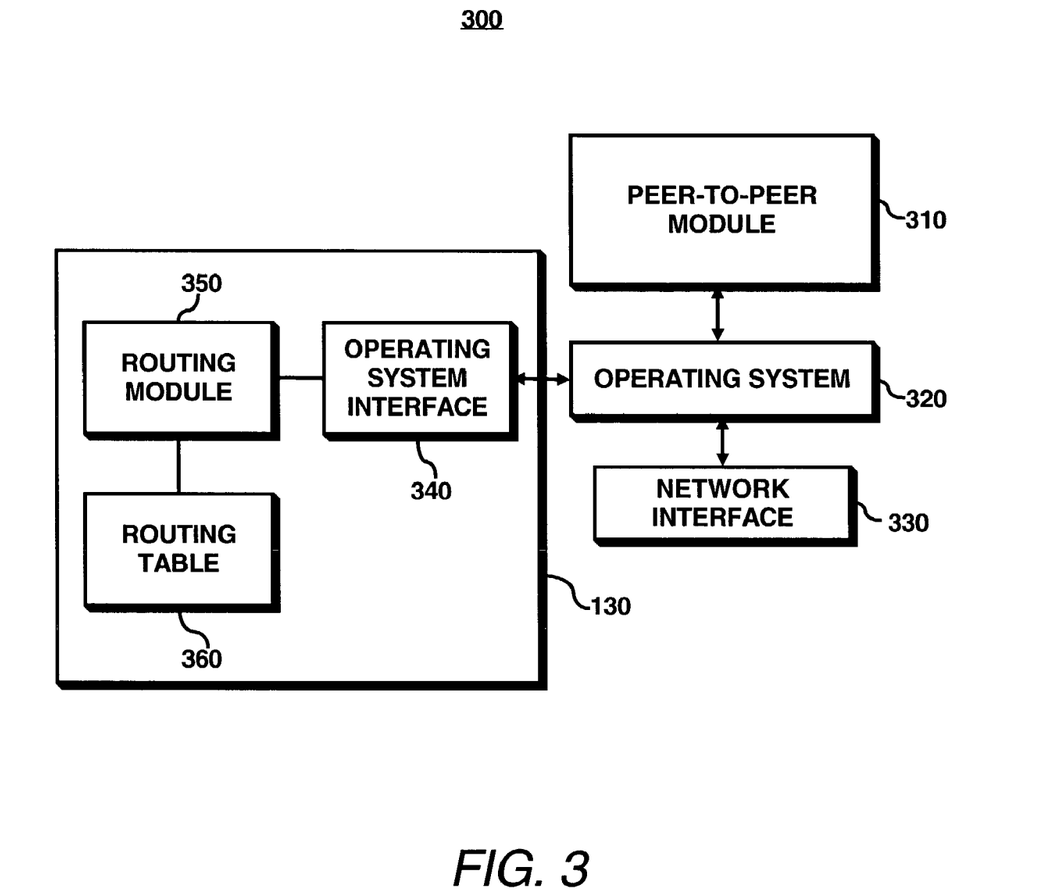
FIG. 3 illustrates an exemplary architecture for an expressway routing module shown in FIG. 1 according to another embodiment.

FIG. 3 illustrates an exemplary architecture 300 for the expressway routing module 130 shown in FIG. 1 in accordance with an embodiment. It should be readily apparent to those of ordinary skill in the art that the architecture 300 depicted in FIG. 3 represents a generalized schematic illustration and that other components may be added or existing components may be removed or modified. Moreover, the architecture 300 may be implemented using software components, hardware components, or a combination thereof.

As shown in FIG. 3, the architecture 300 may include a peer-to-peer module, an operating system 320, the expressway routing module 130, and a network interface. The peer-to-peer module 310 may be configured to provide the capability to a user of a peer to share information with another peer, i.e., each peer may initiate a communication session with another peer. The peer-to-peer module 310 may be a commercial off-the-shelf application program, a customized software application or other similar computer program. Such programs such as KAZAA, NAPSTER, MORPHEUS, or other similar P2P applications may implement the peer-to-peer module 310.

The expressway routing module 130 may be configured to monitor an interface between the peer-to-peer module 310 and the operating system 320 through an operating system interface 340. The operating system interface 340 may be implemented as an application program interface, a function call or other similar interfacing technique.

The expressway routing module 130 may include a routing module 350 and a routing table 360. The routing module 350 may be configured to implement the expressway overlay network and the expressway routing. More particularly, the routing module 350 may create an overlay network described with respect to FIG. 2, by implementing routing tables as shown in FIG. 4.

Figure 4:
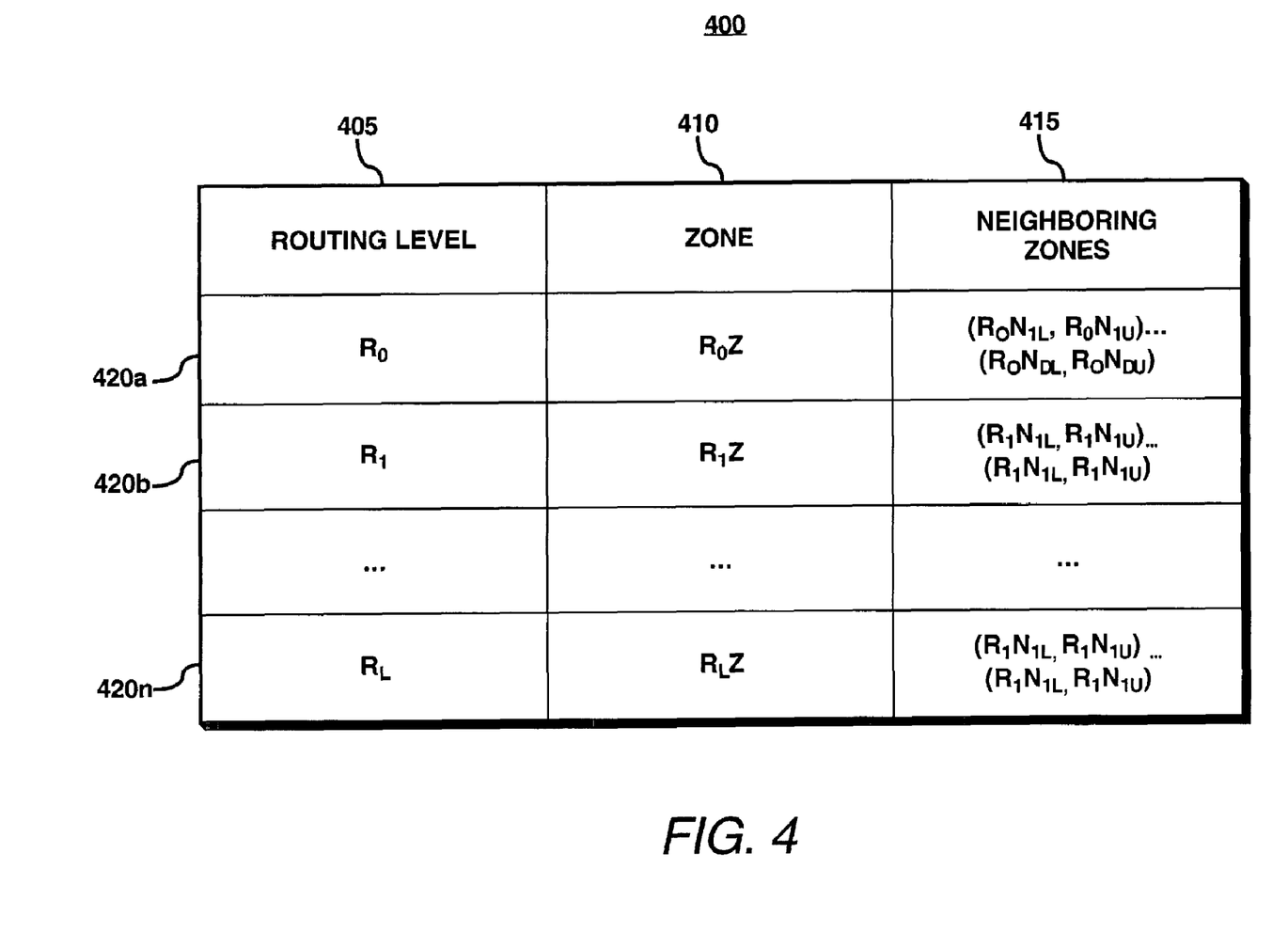
FIG. 4 illustrates a routing table shown in FIG. 3 in accordance with yet another embodiment.

FIG. 4 illustrates routing table 360 as shown in FIG. 3 in accordance with an embodiment. It should be readily apparent to those of ordinary skill in the art that the routing table 360 depicted in FIG. 4 represents a generalized illustration and that other fields may be added or existing fields may be removed or modified.

As shown in FIG. 4, the routing table 360 may include a routing level field 405, a zone field 410, and a neighboring zones field 415. In one embodiment, the values in the routing level field 405, the zone field 410, and the neighboring zones 415 are associated or linked together in each entry of the entries 420a . . . 420n.

A value in the routing level field 405 may indicate the span the between zone representatives. The range of values for the level of the zone may range from the basic unit of the P2P system ($R_L$) to the entire space of the P2P system ($R_O$).

A value in the zone field 410 may indicate which zones the associated peer is aware thereof. At the $R_O$ level for peer 1, the zone would be in the entire space of the existing P2P network. For example, with reference to FIG. 2, the entire space of the P2P system is a Cartesian space of two dimensions (x, y). The zone may be indicated by a designation of (0 . . . 1) in the x-direction and (0 . . . 1) in the y-direction. At the $R_L$ level for peer 1, the zone may be indicated by a designation of (0 . . . 0.125) in the x-direction and (0.875 . . . 1).

A values in the neighboring zones field 415 indicate the identified neighbor zones to the peer. A neighbor zone may be determined by whether a zone shares a common border in the coordinate space; i.e., in a d-dimensional coordinate space, two nodes are neighbors if their coordinate spans overlap along d-1 dimensions and abut along one dimension. Continuing on with the above example, at the $R_O$ level for peer 1, the neighboring zones may be designated as lower neighbor zone: (0 . . . 1)(0 . . . 1) with zone representative as peer 1 and upper neighbor zone (0 . . . 1)(0 . . . 1) with zone representative as peer 1 in the x-direction. The neighboring zones in the y-direction may be designated as lower neighbor zone (0 . . . 1)(0 . . . 1) with zone representative as peer 1 and upper neighbor zone (0 . . . 1)(0 . . . 1) with zone representative as peer 1. Similarly, for peer 1's zone at level L, its lower neighbor along x-direction is the zone (0.875 . . . 1)(0.875 . . . 1) with peer 8 as the representative, whereas it upper neighbor is the zone (0.125 . . . 0.25) (0.875 . . . 1.0) with peer 9 as representative. It should be noted that only representative for neighbor zones at level L need to be kept as hard state (i.e., unmodified), the representatives for neighbor zones at a lower-level are soft states that can be modified on-the-fly to adapt to changing network conditions. In one embodiment, the representatives of a neighbor zone are selected based on closest distance (e.g., number of hops) to the current peer.

Returning to FIG. 3, the routing module 350 may be implemented as a software program, a utility, a subroutine, or other similar programming entity. In this respect, the routing module 350 may be implemented using software languages such as C, C++, JAVA, etc. Alternatively, the routing module 350 may be implemented as an electronic device utilizing an application specific integrated circuit, discrete components, solid-state components or combination thereof.

The operating system 320 may be configured to manage the software applications, data and respective hardware components (e.g., displays, disk drives, etc.) of a peer. The operating system 320 may be implemented by the MICROSOFT WINDOWS family of operating systems, UNIX, HEWLETT-PACKARD HP-UX, LINUX, RIM OS, and other similar operating systems.

The operating system 320 may be further configured to couple with the network interface 330 through a device driver (not shown). The network interface 330 may be configured to provide a communication port for the respective peer over the network 120 (shown in FIG. 1). The network interface 330 may be implemented using a network interface card, a wireless interface card or other similar input/output device.

Figure 5:
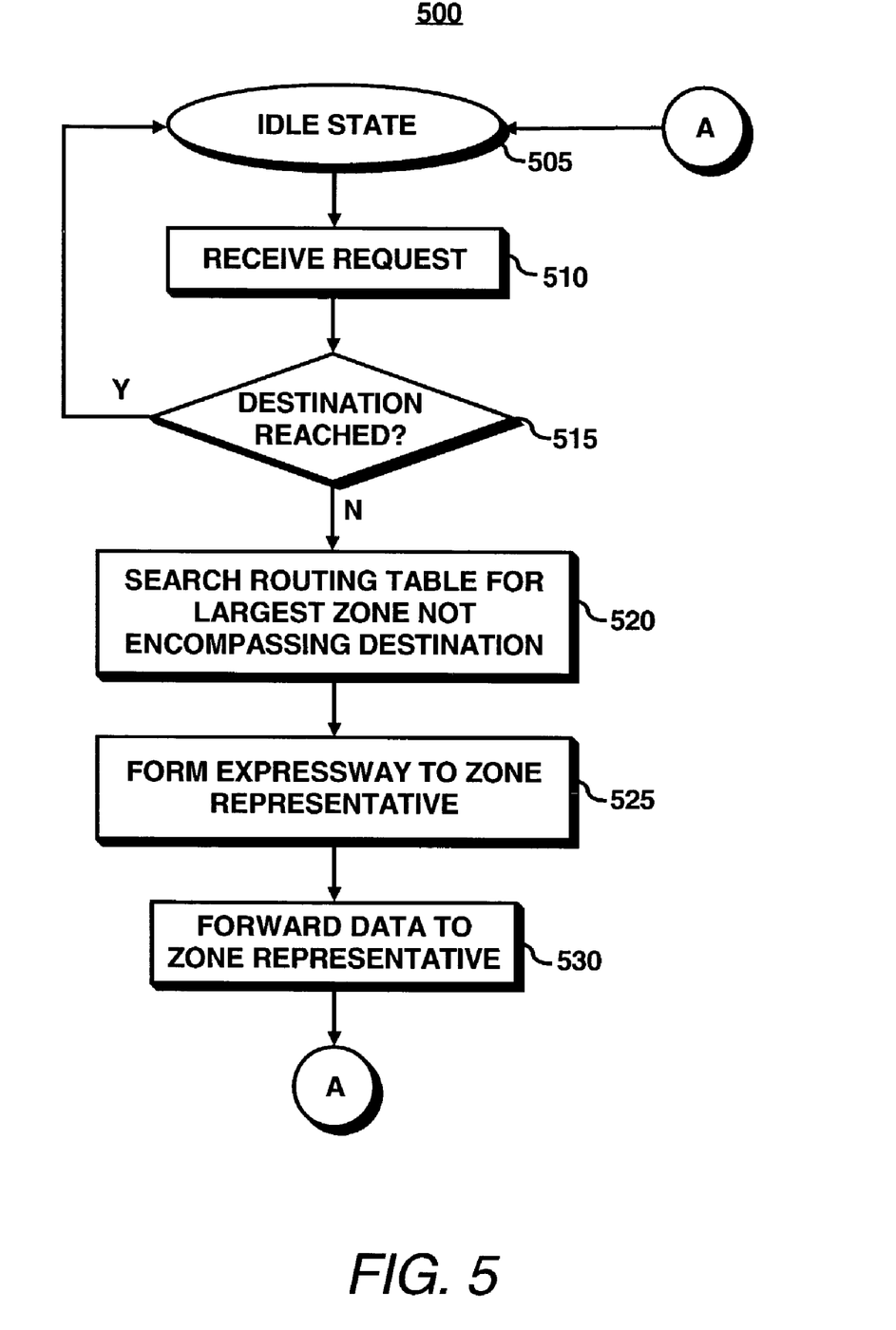
FIG. 5 illustrates an exemplary flow diagram according to yet another embodiment.

FIG. 5 illustrates an exemplary flow diagram for a method 500 of the expressway routing module 130 and routing module 350 shown in FIGS. 1 and 3 in accordance with another embodiment. It should be readily apparent to those of ordinary skill in the art that this method 500 represents a generalized illustration and that other steps may be added or existing steps may be removed or modified.

As shown in FIG. 5, the routing module 350 of the expressway routing module 130 may be configured to be in an idle state in step 505. The routing module 350 may monitor the network interface 330 via the operating system 320 (shown in FIG. 3) for any received requests to route data. The requests may be initiated by a user of a peer or the requests may be forwarded to the receiving peer functioning as an intermediate peer.

In step 510, the routing module 350 may detect a request (or message) received through the network interface 330. The routing module 350 may determine a destination address associated with the received message. The routing module 350 may be configured to temporarily store the message for processing.

In step 515, the routing module 350 determines whether the message has reached its destination. More particularly, the routing module 350 may check the destination address of the message to determine whether the receiving peer is the destination for the message. If the destination is the receiving peer, the routing module 350 may return to the idle state of step 505.

Otherwise, in step 520, the routing module 350 may be configured to search the routing table 350 for a largest zone not encompassing the destination. It should be noted that the largest zone that does not encompass the destination can always be found, given the way the zones are determined as described above.

In step 525, the routing module 350 may be configured to form a communication channel, i.e., an expressway, to the zone representative of the destination zone at the level of the largest zone. The routing module 350 may forward the requested data to the zone representative in the destination zone in step 530. The zone representative will then forward the data to the destination peer. Subsequently, the routing module 350 may return to the idle state of step 505.

Figure 6:
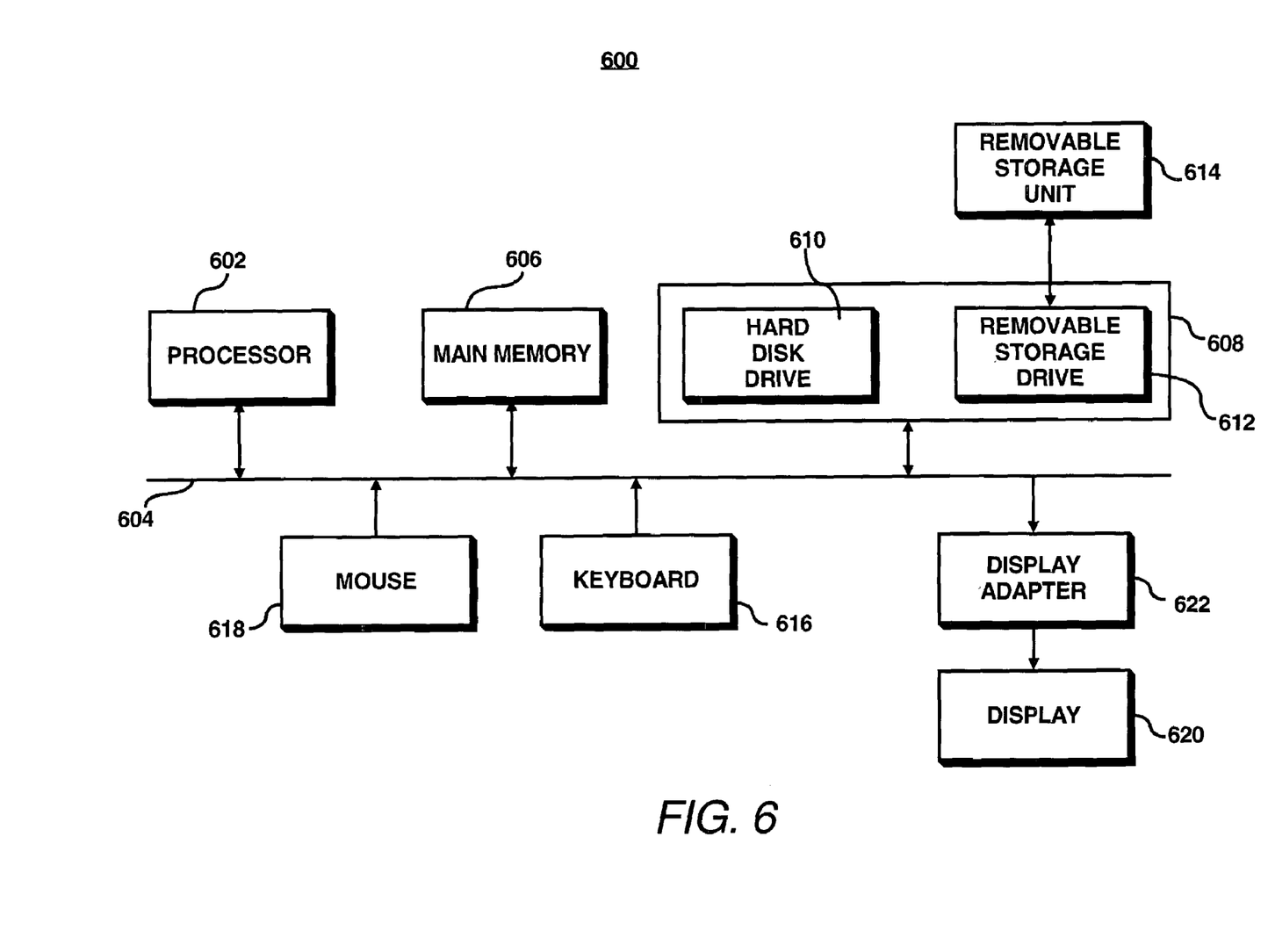
FIG. 6 illustrates a computer system where an embodiment may be practiced.

FIG. 6 illustrates an exemplary block diagram of a computer system 600 where an embodiment may be practiced. The functions of the expressway routing module may be implemented in program code and executed by the computer system 600. The expressway routing module may be implemented in computer languages such as PASCAL, C, C++, JAVA, etc.

As shown in FIG. 6, the computer system 600 includes one or more processors, such as processor 602, that provide an execution platform for embodiments of the expressway routing module. Commands and data from the processor 602 are communicated over a communication bus 604. The computer system 600 also includes a main memory 606, such as a Random Access Memory (RAM), where the software for the expressway routing module may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the expressway routing module may be stored. The removable storage drive 612 reads from and/or writes to a removable storage unit 614 in a well-known manner. A user interfaces with the expressway routing module with a keyboard 616, a mouse 618, and a display 620. The display adaptor 622 interfaces with the communication bus 604 and the display 620 and receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of expressway routing among peers, comprising:

identifying an existing, predefined peer-to-peer (P2P) network to which the peers belong;

implementing an overlay network to overlay the P2P network for routing data over the P2P network by dividing the P2P network into multiple zones, each zone encompassing an area of the P2P network;

receiving a request to forward data in the P2P network;

determining a destination from said request;

searching a routing table for an expressway route in the overlay network based on one or more of the multiple zones of the overlay network to said destination; and transmitting said data across said expressway route to said destination.

2. The method according to claim 1, wherein said searching of said routing table further comprises:

determining a largest zone of the multiple zones in the overlay network that does not encompass said destination from said zones.

3. The method according to claim 2, further comprising:

forming said expressway route to a zone representative of said largest zone that does not encompass said destination.

4. The method according to claim 2, wherein the multiple zones of the overlay network includes a first zone that encompasses one or more other zones, and the largest zone that does not encompass said destination from said zones is the first zone.

5. The method according to claim 1, further comprising:

terminating said searching of said routing table in response to said destination being a peer receiving said request to forward said data.

6. The method according to claim 1, further comprising:

forming a TCP/IP connection to build said expressway route to said destination.

7. The method according to claim 1, further comprising:

determining a plurality of intermediate zones in response to said search of routing table for said expressway; and selecting an intermediate zone from said plurality of intermediate zones.

8. The method according to claim 7, wherein said selection of said intermediate zone of said plurality of intermediate zones based on said intermediate zone being closest to said destination.

9. The method according to claim 7, further comprising:

forming said expressway route to a zone representative of said intermediate zone; and transmitting said data to said zone representative of said intermediate zone.

10. The method according to claim 9, further comprising:

searching a routing table associated with said zone representative of said intermediate zone for another expressway route to said destination;

forming said another expressway route to said destination; and transmitting said data to destination over said another expressway route to said destination.

11. An apparatus for expressway routing among peers, comprising:

means for identifying an existing, predefined peer-to-peer (P2P) network to which the peers belong;

means for implementing an overlay network to overlay the P2P network for routing data over the P2P network dividing the P2P network into multiple zones, each zone encompassing an area of the P2P network;

means for receiving a request to forward data in the P2P network;

means for determining a destination from said request;

means for searching a routing table for an expressway route in the overlay network based on one or more of the multiple zones of the overlay network to said destination; and means for transmitting said data across said expressway route to said destination.

12. The apparatus according to claim 11, wherein the multiple zones or the overlay network includes a first zone that encompasses one or more other zones, and wherein said means for searching of said routing table further comprises:

means far determining a largest zone of the multiple zones in the overlay network that does not encompass said destination from said zones, and the largest zone is the first zone.

13. The apparatus according to claim 12, further comprising:

means for forming said expressway route to a zone representative of said largest zone that does not encompass said destination.

14. The apparatus according to claim 11, further comprising:

means for terminating said searching of said routing table in response to said destination being a peer receiving said request to forward said data.

15. The apparatus according to claim 11, further comprising:

means for forming a TCP/IP connection to build said expressway route to said destination.

16. The apparatus according to claim 11, further comprising:

means for determining a plurality of intermediate zones in response to said search of routing table for said expressway; and means for selecting an intermediate zone from said plurality of intermediate zones.

17. The apparatus according to claim 16, further comprising:

means for forming said expressway route to a zone representative of said intermediate zone; and means for transmitting said data to said zone representative of said intermediate zone.

18. The apparatus according to claim 17, further comprising:

means for searching a routing table associated with said zone representative of said intermediate zone for another expressway route to said destination;

means for forming said another expressway route to said destination; and means for transmitting said data to destination over said another expressway route to said destination.

19. A computer readable storage medium on which is embedded one or more computer programs, said one or more computer programs implementing a method of expressway routing data among peers in a predefined peer-to-peer (P2P) system, said one or more computer programs comprising a set of instructions for:

implementing an overlay network overlay the P2P system for routing data over the P2P system by dividing the P2P system into multiple zones, each zone encompassing an area of the P2P network;

searching a routing table for an expressway route in the overlay network to a destination, said expressway route being a greatest logical distance between a source to said destination based on one or more of the multiple zones of the overlay network; and transmitting said data across said expressway route to said destination from said source.

20. The computer readable storage medium according to claim 19, said set of instructions further comprising:

determining a largest zone that does not encompass said destination.

21. The computer readable storage medium according to claim 20, said set of instructions further comprising:

forming said expressway route to a zone representative of said largest zone that does not encompass destination.

22. The computer readable storage medium according to claim 19, said set of instructions further comprising:
   forming a TCP/IP connection to build said expressway route to said destination.

23. The computer readable storage medium according to claim 19, said set of instructions further comprising:
   determining a plurality of intermediate zones in response to said search of routing table for said expressway; and
   selecting an intermediate zone from said plurality of intermediate zones.

24. The computer readable storage medium according to claim 23, wherein said selection of said intermediate zone of said plurality of intermediate zones based on said intermediate zone being closest to said destination.

25. The computer readable storage medium according to claim 23, said set of instructions further comprising:
   forming said expressway route to a zone representative of said intermediate zone; and
   transmitting said data to said zone representative of said intermediate zone.

26. The computer readable storage medium according to claim 25, said set of instructions further comprising:
   searching a routing table associated with said zone representative of said intermediate zone for another expressway route in the overlay network to said destination;
   forming said another expressway route to said destination; and
   transmitting said data to destination over said another expressway route to said destination.

27. A system for expressway routing among peers in a peer-to-peer network, said system comprising:
   a pear-to-peer module configured to implement said peer-to-peer (P2P) network;
   a routing module configured to implement an overlay network to overlay the P2P network for routing data over the P2P network by dividing the P2P network into multiple zones, each zone encompassing an area of the P2P network, the routing module also adapted to interface with said peer-to-peer module; and
   a routing table adapted to interface with said routing module, wherein said routing module is configured to search said routing table for an expressway route in the overlay network to a destination in the P2P network, said expressway route being a greatest logical distance between a source to said destination based on one or more of the multiple zones in the overlay network and to transmit said data across said expressway route to said destination from said source.

28. The system according to claim 27, further comprising:
   an operating system configured to manage said peer-to-peer module and said routing module; and
   an operating system interface adapted to connect said operating system and said routing table.

29. The system according to claim 28, further comprising:
   a network interface adapted to interface said peer-to-peer module with a network through said operating system.

30. The system according to claim 27, wherein the routing table is further configured to determine a largest zone that does not encompass said destination.

31. The system according to claim 30, wherein the routing table is further configured to form said expressway route to a zone representative of said largest zone that does not encompass said destination.

32. The system according to claim 27, wherein the routing table is further configured to form a TCP/IP connection to build said expressway route to said destination.

33. The system according to claim 27, wherein the routing table is further configured to determine a plurality of intermediate zones in response to said search of routing table for said expressway and to select an intermediate zone from said plurality of intermediate zones.

34. The system according to claim 33, wherein the routing table is further configured to select said intermediate zone of said plurality of intermediate zones based on said intermediate zone being closest to said destination.

35. The system according to claim 27, wherein the routing table is further configured to form said expressway route to a zone representative of said intermediate tone and to transmit said data to said zone representative of said intermediate zone.

36. The system according to claim 35, wherein the routing table is further configured to search a routing table associated with said zone representative of said intermediate zone for another expressway route to said destination, to form said another expressway route to said destination, and to transmit said data to destination over said another expressway route to said destination.

* * * * *

UNITED STATES PATENT AND TRADEMARK OFFICE
CERTIFICATE OF CORRECTION

PATENT NO. : 7,266,082 B2
APPLICATION NO. : 10/231184
DATED : September 4, 2007
INVENTOR(S) : Zhichen Xu et al.

It is certified that error appears in the above-identified patent and that said Letters Patent is hereby corrected as shown below:

In column 9, line 55, in Claim 11, insert -- by -- before "dividing".

In column 9, line 67, in Claim 12, delete "or" and insert -- of --, therefor.

In column 10, line 3, in Claim 12, delete "far" and insert -- for --, therefor.

In column 10, line 49, in Claim 19, after "network" insert -- to --.

In column 11, line 33, in Claim 27, delete "pear-to-peer" and insert -- peer-to-peer --, therefor.

In column 12, line 34, in Claim 35, delete "tone" and insert -- zone --, therefor.

Signed and Sealed this

Twenty-second Day of July, 2008

JON W. DUDAS
*Director of the United States Patent and Trademark Office*